US006061901A

United States Patent [19]

Tanaka

[11] Patent Number: 6,061,901

[45] Date of Patent: May 16, 2000

[54] PNEUMATIC SCREW PUNCHING MACHINE

[75] Inventor: Hiroshi Tanaka, Tokyo, Japan

[73] Assignee: MAX Co., Ltd., Tokyo, Japan

[21] Appl. No.: 09/004,205

[22] Filed: Jan. 8, 1998

[30] Foreign Application Priority Data

Jan. 31, 1997 [JP] Japan .................................... 9-019046

[51] Int. Cl.$^{7}$ ...................................................... B23P 19/00

[52] U.S. Cl. ............................................... 29/798; 227/130

[58] Field of Search .............................. 29/798, 716, 432, 29/432.2; 227/130; 81/434

[56] References Cited

U.S. PATENT DOCUMENTS

| | | |
|---|---|---|
| 3,107,584 | 10/1963 | Powers . |
| 3,351,257 | 11/1967 | Reich et al. . |
| 3,406,889 | 10/1968 | Cast et al. . |
| 3,673,922 | 7/1972 | Doyle . |
| 3,969,988 | 7/1976 | Maurer . |
| 4,260,092 | 4/1981 | Austin . |
| 4,509,669 | 4/1985 | Elliesen . |
| 5,181,450 | 1/1993 | Monacelli . |
| 5,207,143 | 5/1993 | Monacelli . |
| 5,476,205 | 12/1995 | Canlas et al. . |
| 5,676,300 | 10/1997 | Nakazato et al. . |
| 5,730,035 | 3/1998 | Ohmori et al. . |
| 5,732,870 | 3/1998 | Moorman et al. . |
| 5,850,961 | 12/1998 | Braun et al. . |

FOREIGN PATENT DOCUMENTS

| | | |
|---|---|---|
| 3830-138 | 9/1989 | Germany . |

*Primary Examiner*—David P. Bryant
*Attorney, Agent, or Firm*—Fattibene & Fattibene; Paul A. Fattibene; Arthur T. Fattibene

[57] ABSTRACT

To facilitate maintenance, a pneumatic punching machine of this invention includes a poppet portion 44 at the top of a piston 28 of an air cylinder 23 and a piston catch 43 is disposed inside a head cap 24. The piston 28 is fixed as the poppet portion 44 fits into the piston catch 43 under a standby state. A retaining ring 40 is fitted into the head cap 24 to prevent fall-off of a head valve 39. A circumferential groove 41 is formed on the inner peripheral surface of the front part of the head cap 24 and a ring-like seal 42 is fitted into the groove 41. When a driver bit 29 is exchanged, fitting bolts are removed and a housing 22 and the head cap 24 are separated. Then, the head cap 24, the head valve 39, the seal 42, the piston 28 and the driver bit 29 can be removed integrally from the housing 22.

4 Claims, 5 Drawing Sheets

PNEUMATIC SCREW PUNCHING MACHINE

FIELD OF THE INVENTION

This invention relates to a pneumatic screw punching machine and more particularly, to a pneumatic screw punching machine which facilitates its maintenance.

BACKGROUND OF THE INVENTION

In the field of pneumatic tools, a pneumatic screw punching machine having a construction in which a screw is punched to a certain extent into an objective article by a driver bit coupled to a piston and is then fastened by driving and rotating the driver bit by an air motor.

FIG. 5 of the accompanying drawings shows a cylinder head portion of such a pneumatic screw punching machine. In this drawing, reference numeral 1 denotes a housing and a driver bit 4 is shown coupled to a piston 3 of an air cylinder 2 inside this housing 1. A head cap 5 is coupled by a bolt (not shown) to an open end portion of the housing 1 and a seal 6 is interposed between the housing 1 and the head cap 5 to prevent leak of air of an air chamber 7 inside the housing 1.

A head valve 8 fitted into the head cap 5 is brought into pressure contact with a valve seat 9 of the open edge portion of the air cylinder 2 by a pilot pressure acting on the rear surface (right side in the drawing) under the standby state and cuts off an air passage between the air chamber 7 and the air cylinder 2.

When a stem 12 of a trigger valve 11 is pushed by operating a trigger lever 10 pivotally fitted to the housing 1, the pilot pressure acting on the rear surface of the head valve 8 is discharged and the head valve 8 is moved back by the pressure of the air chamber 7. In consequence, pressure air of the air chamber 7 is supplied into the air cylinder 2, and the piston 3 and the driver bit 4 advance, eject a screw inside a nose (not shown) and punch it into a building material. Subsequently, the air motor (not shown) drives and rotates the driver bit 4 to thereby fasten the screw to the building material.

When any component inside the housing 1 is exchanged or is repaired, the cap fitting bolt is removed to separate the housing 1 and the head cap 5. When the distal end portion of the driver bit 4 is worn out and must be exchanged with new one, for example, the valve seat 9 at the head of the air cylinder 2 is removed or the air cylinder 2 is withdrawn as a whole from the housing 1 to take out the piston 3 and the driver bit 4 and the driver bit 4 is then exchanged.

Therefore, this pneumatic screw punching machine involves the problem that the procedures for disassembly and assembly are much complicated and time-consuming. Another problem is that the head cap 5, the seal 6, the head valve 8 and the valve seat 9 are likely to be assembled in a wrong way or they are likely to be lost, and the seal, etc, are caused to deform during the maintenance operation.

Accordingly, the present invention is directed to solve the problems described above by facilitating maintenance of a pneumatic screw punching machine.

SUMMARY OF THE INVENTION

To accomplish the object described above, the present invention provides a pneumatic screw punching machine of the type in which an air cylinder is accommodated inside a housing, a ring type seal and a head cap are fitted to an open portion of the housing on the side of the cylinder head and a slidable head valve fitted into the head cap controls operation/stop of the air cylinder; wherein a poppet portion is formed at the top of a piston of the air cylinder, a piston catch opposing the poppet portion of the piston is disposed inside the head cap so that the poppet portion of the piston and the piston catch can fit and separate relative to each other; a retaining ring for preventing fall-off of the head valve is fitted to the head cap; an engagement portion for holding the seal such as a groove or a pawl is formed at an outer edge portion or an inner edge portion of a seal contact surface of the head cap, and the seal is fitted to the seal contact surface through the engagement portion; and when the head cap is separated from the housing, the head valve, the seal, the piston and the driver bit can be removed integrally with the head cap from the housing.

DETAILED DESCRIPTION OF THE PREFERRED EMBODIMENTS

Figure 1:
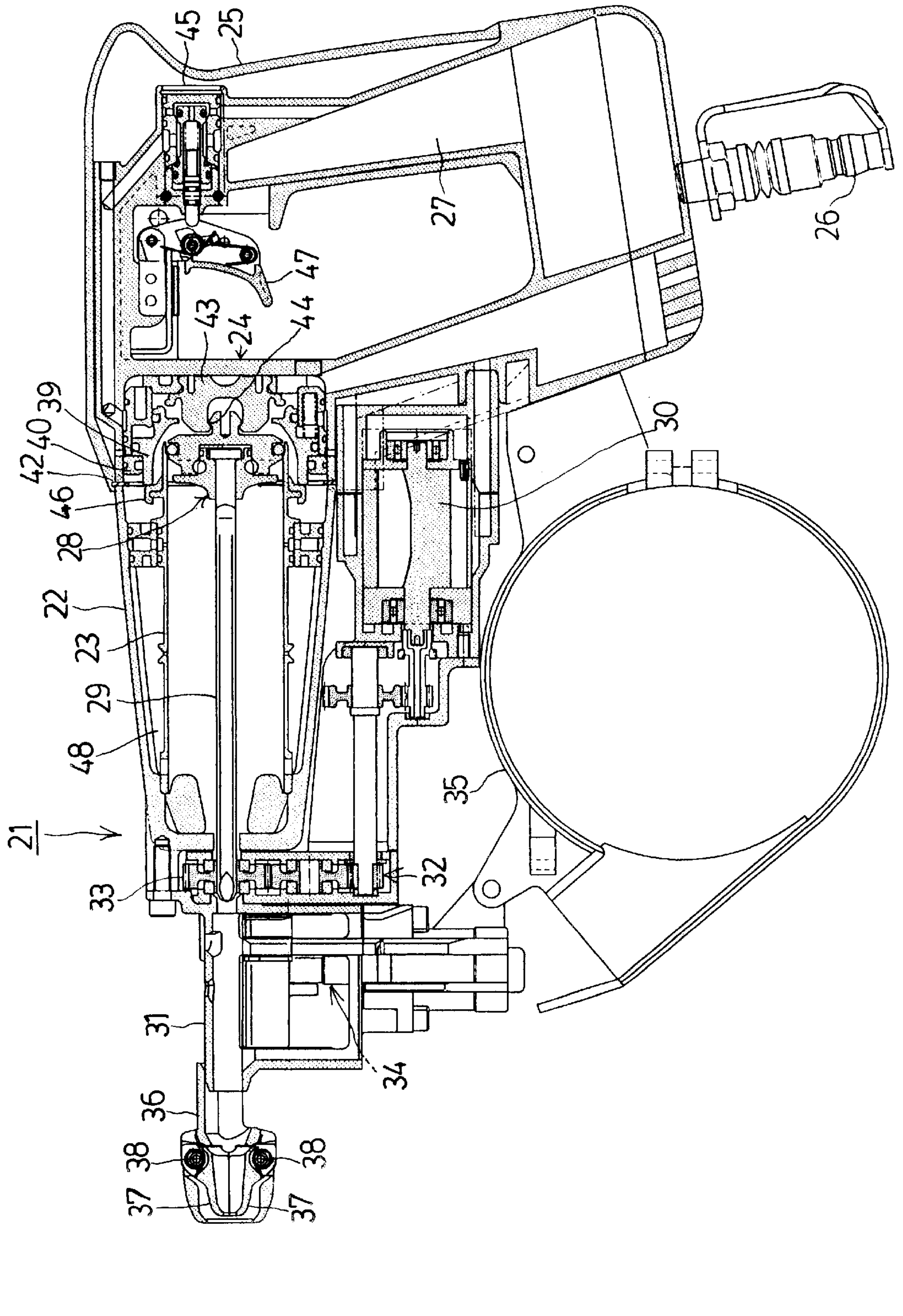
FIG. 1 is a sectional side view of a pneumatic screw punching machine according to an embodiment of the present invention.

Hereinafter, a preferred embodiment of the present invention will be described in detail with reference to the accompanying drawings. FIG. 1 shows a pneumatic screw punching machine 21. An air cylinder 23 is fitted into a housing 22 and a head cap 24 is coupled to an open portion of the housing 22 on the side of a cylinder head by fitting bolts (not shown). A loop-shaped handle 25 is formed integrally with the head cap 24 and pressure air is supplied to an air chamber 27 inside the loop-shaped handle 25 by connecting an air hose to an air hose connector 26 which is disposed at the lower end of the loop-shaped handle 25.

An air motor 30 for driving and rotating a driver bit 29 coupled with a piston 28 inside the air cylinder 23 is juxtaposed with the air cylinder 23 and power of the air motor 30 is transmitted to a drive gear 33 through a reduction gear mechanism 32 disposed between the distal end of the air cylinder 23 and a nose portion 31. The drive gear 33 and the driver bit 29 are coupled by spline coupling, and the piston 28 and the driver bit 29 are slidable in an axial direction.

A screw feed device 34 disposed on the side surface of the nose portion 31 comprises an air cylinder and a ratchet type feed pawl in the same way as ordinary pneumatic nail punching machines, and interconnection type screws accommodated in a screw magazine 35 are serially supplied into the nose portion 31.

Referring to FIG. 1, a contact arm (not shown) capable of sliding in a screwing direction is disposed on the rear surface of the nose portion 31 and a screw guide 36 fitted to the distal end of the contact arm protrudes from the nose portion 31 in the screw ejecting direction. A chuck capable of being opened and closed is pivotally fitted to the distal end of the screw guide 36, and is closed by a spring 38 under a standby state.

Figure 2:
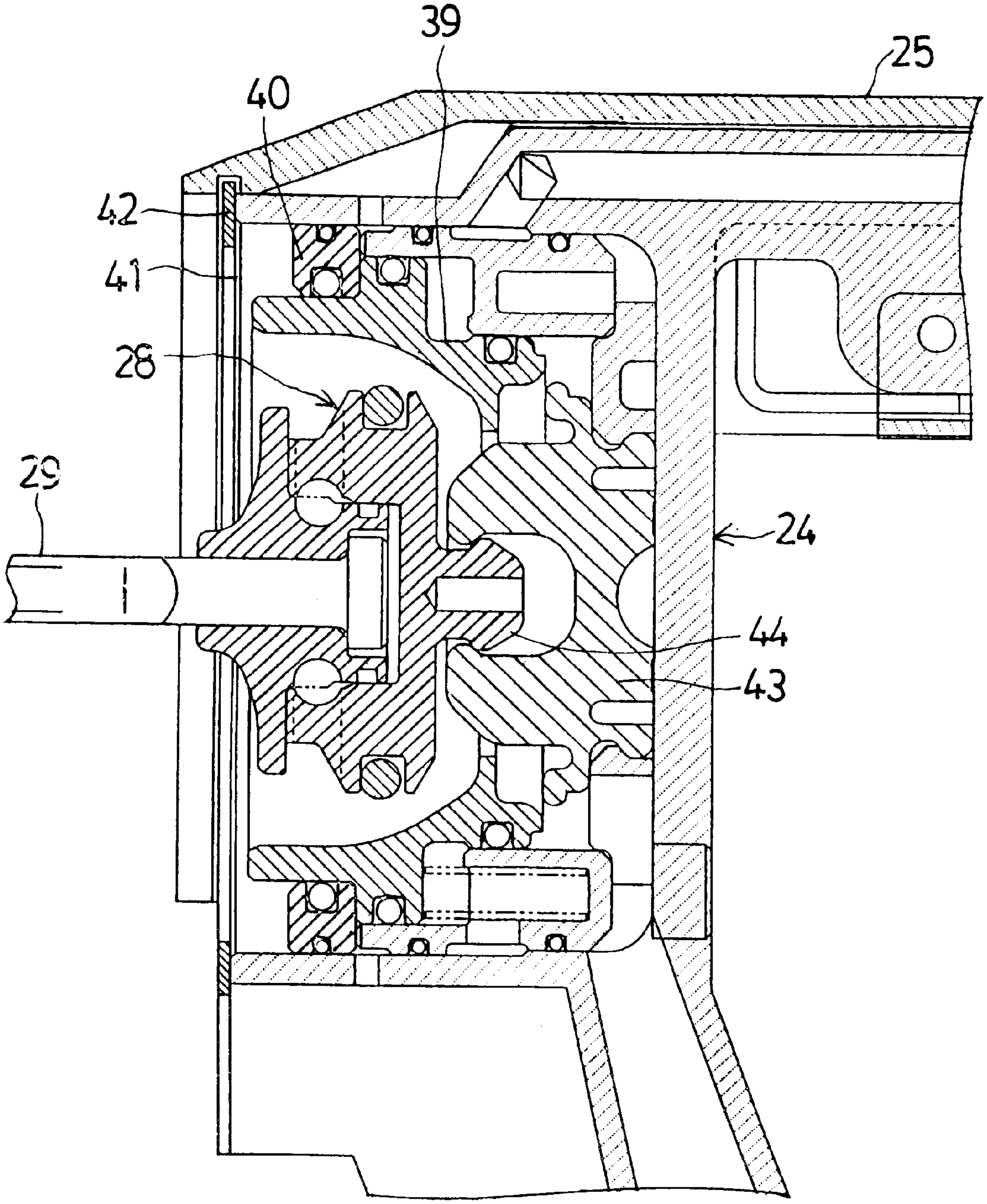
FIG. 2 is a sectional view of a cylinder head portion of the pneumatic screw punching machine shown in FIG. 1.

As shown in FIG. 2 in magnification, a cup-shaped head valve 39 is fitted into the head cap 24 and a retaining ring 40 for preventing fall-off of the head valve is fitted to the front part (left side in the drawing) of the head valve 39. A circumferential groove 41 is formed on the inner peripheral surface of the front portion of the head cap 24 and a ring-like seal 42 is fitted into this groove 41. A piston catch 43 made of flexible rubber is disposed at the center of the inner wall surface of the head cap 24 and protrudes forward through a center hole of the head valve 39, and a poppet portion 44 disposed at the top of the piston 28 can be fitted to, and removed from, the center hole of the piston catch 43.

Under the standby state shown in FIG. 1, a pilot pressure is supplied to the outer peripheral surface (on the right in the drawing) of the rear part of the head valve 39 through the trigger valve 45 inside the loop-shaped handle 25 and the head valve 39 comes into pressure contact with the valve seat 46 fitted to the outer peripheral surface of the air cylinder 23 and cuts off an air passage between the air chamber 27 and the air cylinder 23.

The screw guide 36 is pushed to a screwing object surface and the trigger lever 47 disposed on the loop-shaped handle 25 is operated for rotation. Then, the trigger valve 45 is switched to the open position, the pilot pressure acting on the head valve 39 is released and the head valve 39 is moved by the pressure of the air chamber acting on the front outer peripheral surface of the head valve 39 and separates from the valve seat 46. Consequently, pressure air flows from the air chamber 27 into the air cylinder 23 to activate the piston 28, the poppet portion 44 leaves the piston catch 43 and advances inside the air cylinder, so that the driver bits 29 ejects the screw inside the nose portion 31.

Subsequently, the feed pressure to the air motor 30 rises to activate the air motor 30 and the driver bit 29 is driven and rotated, and fastens the screw to the object surface. When the screw is thus fastened and the air motor 30 comes to halt, the piston 28 as well as the driver bit 29 returns to their standby positions by the pressure of a blowback chamber 48 defined between the outer peripheral surface of the front part of the air cylinder 23 and the housing 22, and the poppet portion 44 of the piston 28 fits to the piston catch 43 and stops there.

Figure 3:
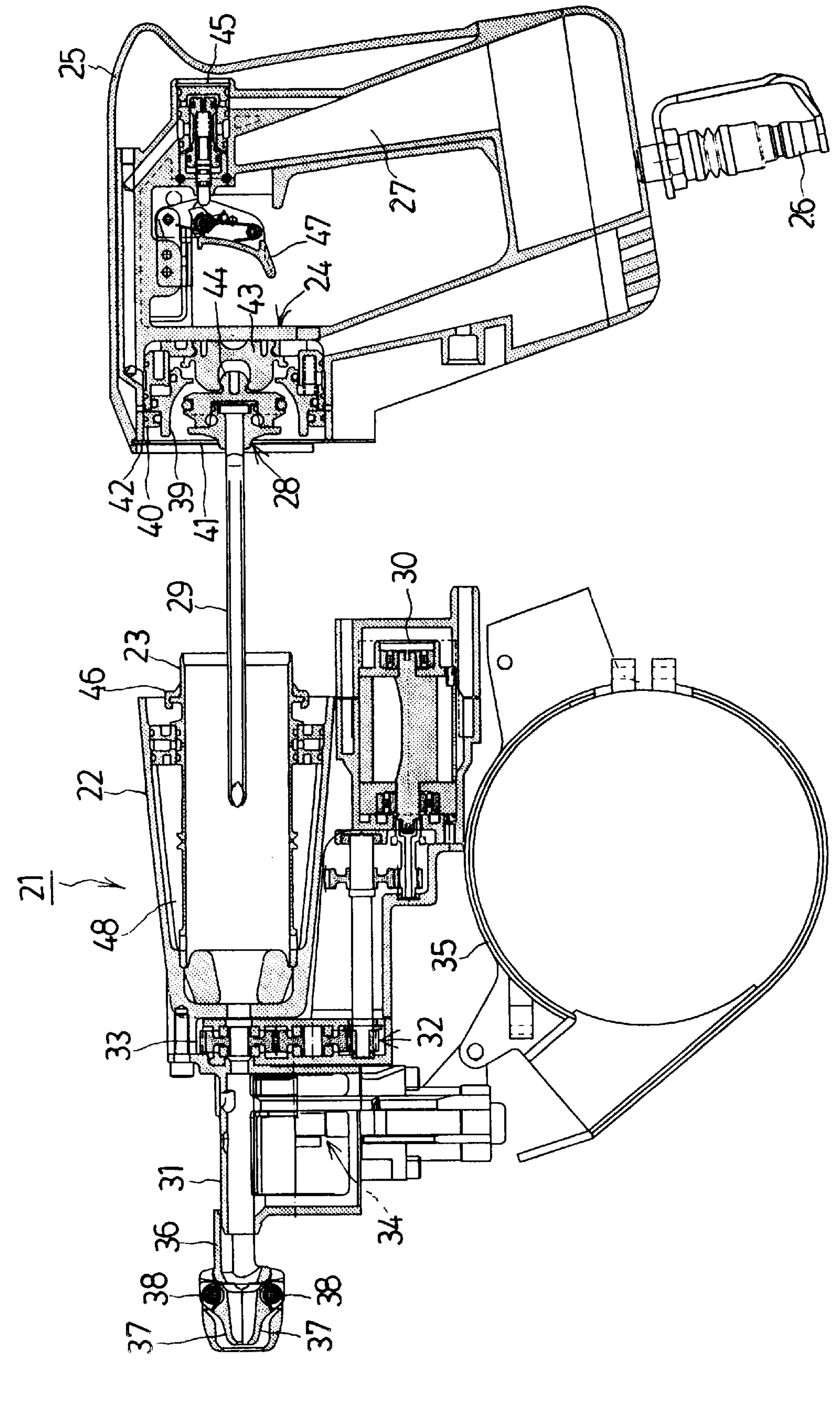
FIG. 3 is a sectional view showing a housing and a cylinder cap shown in FIG. 1 under the separated state.

When the driver bit 29 must be exchanged due to the wear of its distal end or to its breakage, the bolts that couple the housing 22 and the head cap 24 are first removed so as to separate the housing 22 and the head cap 24 from each other as shown in FIG. 3. Then, all of the head cap 24, the head valve 39, the seal 42, the piston 28 and the driver bit 29 can be removed integrally from the housing 22.

Figure 4:
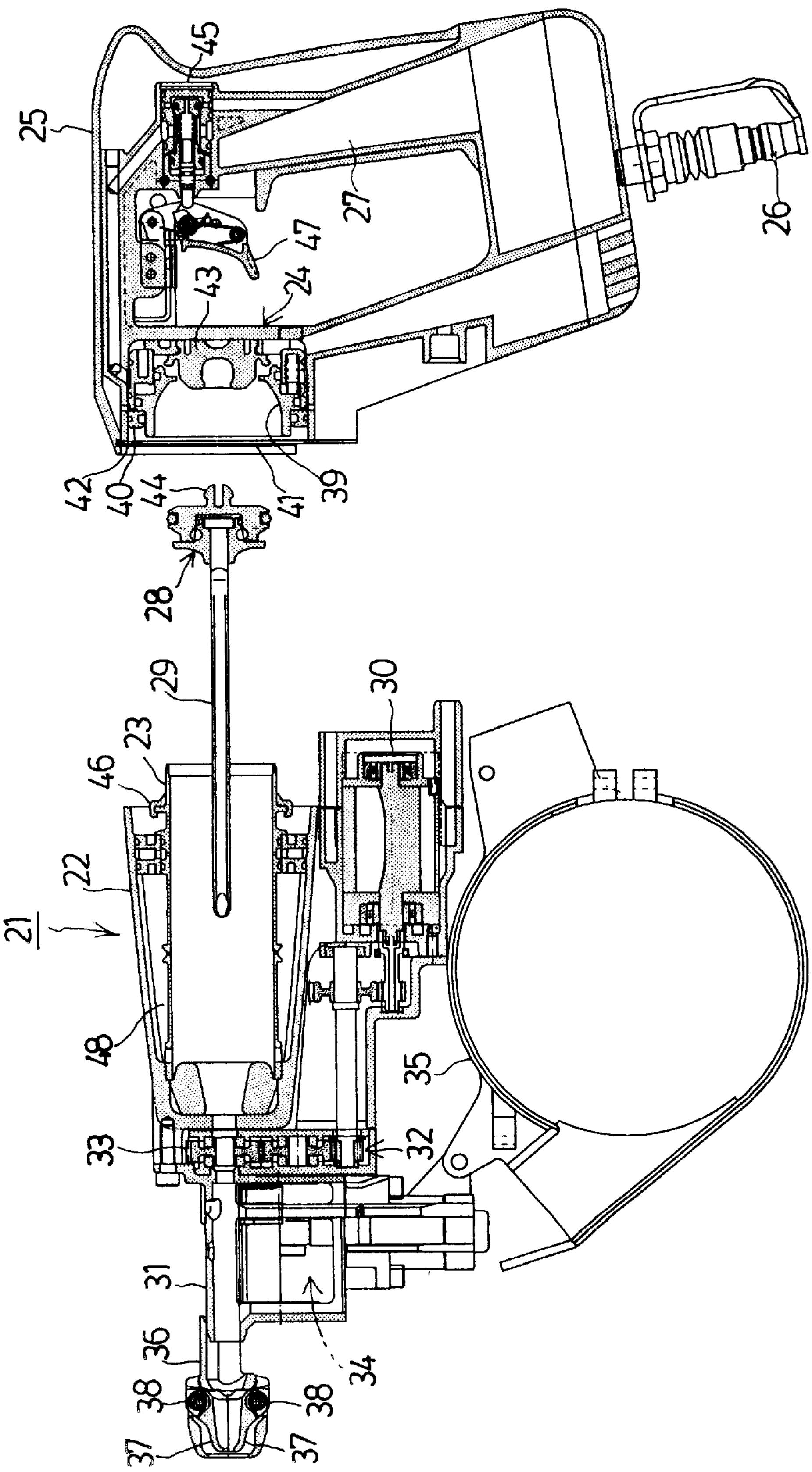
FIG. 4 is a sectional view when a piston is removed from the state shown in FIG. 3.
Figure 5:
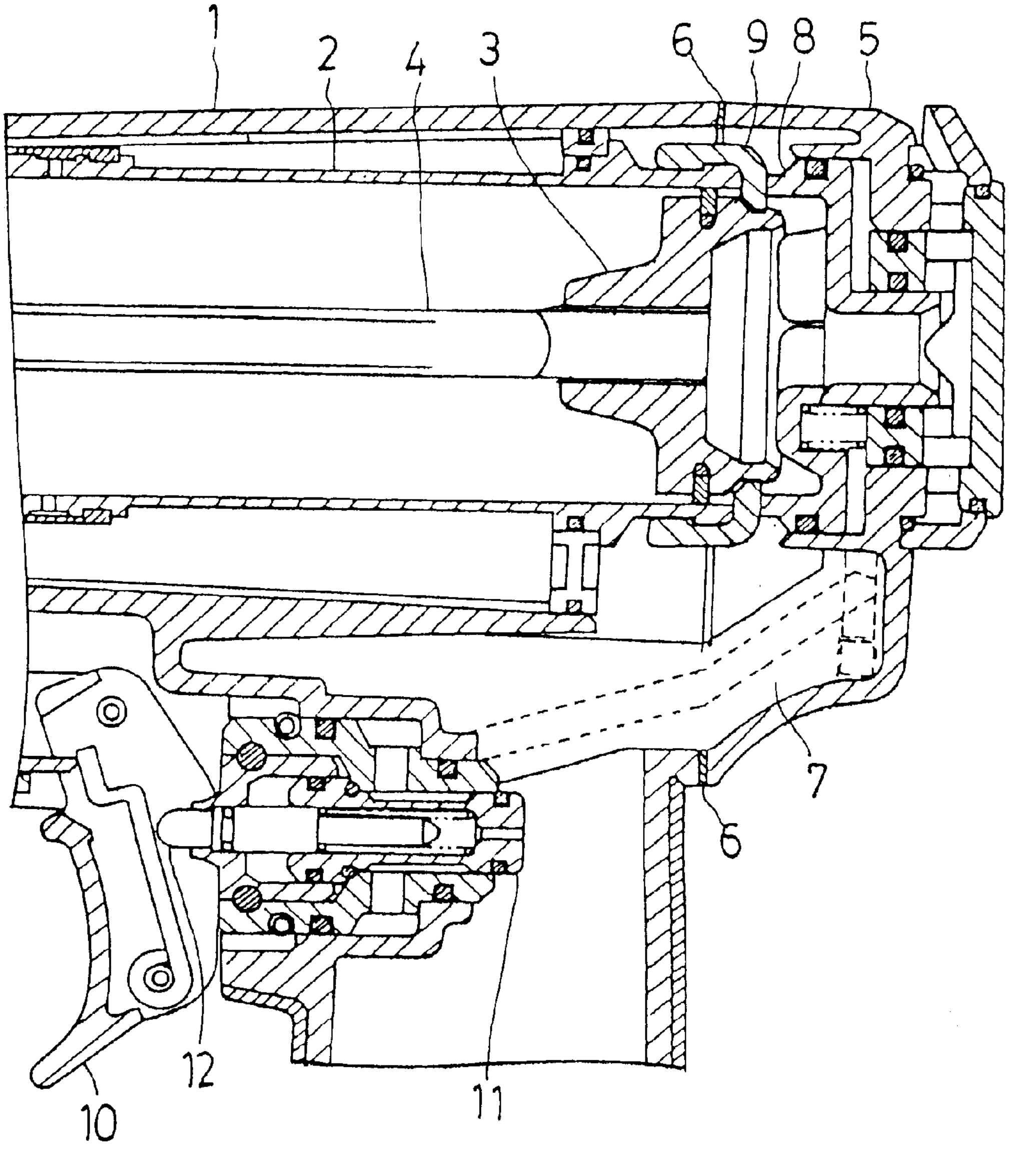
FIG 5 (Prior Art)
FIG. 5 is a sectional view showing a cylinder head portion of a pneumatic screw punching machine according to the prior art.

As the driver bit 29 is pulled forth, the poppet portion 44 of the piston 28 comes off from the piston catch 43 as shown in FIG. 4 and the driver bit 29 can be easily exchanged.

After the driver bit 29 is exchanged, the poppet portion 44 of the piston 28 is pushed into the piston catch 43 of the head cap 24, the head cap 24 is fitted to the housing 22 and the fitting bolts are fastened in the procedure opposite to that of the disassembly process, and the exchange operation of the driver bit can be thus completed.

As described above, according to the pneumatic screw punching machine of the present invention, the head valve, the seal, the piston and the driver bit can be removed integrally with the head cap when the head cap is removed from the housing, and disassembly can be carried out easily. Further, the possible loss of these components and the mistake of assembly can be eliminated, and the working factor of maintenance can be improved remarkably.

Incidentally, the present invention is not particularly limited to the embodiment described above but can be naturally changed or modified in various ways without departing from the scope thereof and the present invention naturally embraces such changes or modifications within the scope thereof.

What is claimed:

1. A pneumatic screw punching machine comprising:

a housing;

an air cylinder accommodated inside said housing;

a ring-shaped seal;

a head cap containing said ring-shaped seal fitted to an open portion of said housing on a side of a cylinder head;

a slidable head valve fitted into said head cap controlling operation of said air cylinder;

a piston within said air cylinder:

a poppet portion formed at the top of said piston of said air cylinder;

a piston catch opposing said poppet portion of said piston disposed inside said head cap so that said poppet portion of said piston and said piston catch can fit and separate relative to each other;

a retaining ring preventing said slidable head valve from falling off fitted to said head cap; and an engagement portion for holding said ring type seal formed at an edge portion of a seal contact surface of said head cap, and said ring-shaped seal is fitted to said seal contact surface through said engagement portion, whereby when said head cap is separated from said housing, said head valve, said ring-shaped seal, said piston, and a driver bit can be removed integrally with said head cap from said housing.

2. A pneumatic screw punching machine providing easy maintenance comprising:

a handle portion;

a trigger valve placed within said handle portion a head cap retained within said handle portion;

a head valve contained within said head cap;

a retaining ring, said retaining ring preventing said head valve from separating from said head cap;

a piston catch formed within said head cap and protruding through said head valve;

a piston;

a poppet portion formed on said piston and adapted to be held by said piston catch;

a driver bit attached to said piston, said driver bit having a spline formed thereon, whereby said handle portion, said trigger valve, said head cap, said head valve, said piston catch, said piston, said poppet portion, and said driver bit can be removed as a single integral unit;

a housing, said housing readily detachable from said handle portion; and a cylinder placed within said housing and adapted to receive said piston, whereby when said housing is separated from said lever portion, said driver bit is readily accessible and easily replaced.

3. A pneumatic screw punching machine providing easy maintenance and replacement of a worn driver bit comprising:

a handle;

a trigger valve within said handle;

a trigger lever coupled to said trigger valve;

a head cap held within said handle;

a head valve held within said head cap;

a retaining ring, said retaining ring holding said head valve in said head cap;

a piston catch formed within said head cap and protruding through a center hole of said head valve;

a piston;

a poppet portion formed on said piston and adapted to be held by said piston catch;

a driver bit attached to said piston, said driver bit having a spline formed thereon;

a housing, said housing readily detachable from said head cap;

a cylinder placed within said housing and adapted to receive said piston;

an air motor adjacent said housing; and a drive gear coupled to said air motor adapted to mesh with the spline on said drive bit, whereby said drive bit is rotated, whereby said drive bit is easily replaced when worn by separating said head cap from said housing.

4. A pneumatic screw punching machine as in claim 3 wherein:

said piston catch is female or internal and said poppet portion is male or external.

* * * * *